United States Patent
Kumon et al.

(10) Patent No.: US 10,953,749 B2
(45) Date of Patent: Mar. 23, 2021

(54) VEHICULAR DISPLAY DEVICE

(71) Applicant: TOYOTA JIDOSHA KABUSHIKI KAISHA, Toyota (JP)

(72) Inventors: Hitoshi Kumon, Aichi-gun (JP); Hironori Nagata, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/291,431

(22) Filed: Mar. 4, 2019

(65) Prior Publication Data

US 2019/0291578 A1 Sep. 26, 2019

(30) Foreign Application Priority Data

Mar. 20, 2018 (JP) .............................. JP2018-052904

(51) Int. Cl.
*B60K 35/00* (2006.01)
*B60R 11/02* (2006.01)
(Continued)

(52) U.S. Cl.
CPC .............. *B60K 35/00* (2013.01); *B60K 37/06* (2013.01); *B60R 11/0235* (2013.01);
(Continued)

(58) Field of Classification Search
CPC .. B60K 35/00; B60K 37/06; B60K 2370/151; B60K 2370/1438; B60K 2370/744;
(Continued)

(56) References Cited

U.S. PATENT DOCUMENTS

2007/0222769 A1* 9/2007 Otsuka ............... G01C 21/3664
345/173
2011/0107272 A1* 5/2011 Aguilar ............... G06F 3/04883
715/853
(Continued)

FOREIGN PATENT DOCUMENTS

DE  10 2015 211 358 A1  12/2015
IE   0 2015 216 108 A1   3/2017
(Continued)

*Primary Examiner* — Temesghen Ghebretinsae
*Assistant Examiner* — Ivelisse Martinez Quiles
(74) *Attorney, Agent, or Firm* — Oliff PLC

(57) ABSTRACT

The vehicular display device includes: a touchscreen disposed substantially at a center position in a vehicle width direction in front of a cockpit of a vehicle; a reception section at least partially provided to the touchscreen and configured to receive operation input from a user; and a display control section configured to display, on a display screen of the touchscreen, a first screen corresponding to a first function and a second screen corresponding to a second function such that the first screen and the second screen are arrayed in a left-right direction, the display control section being configured to perform, in accordance with a predetermined first instruction operation received by the reception section, switching control in which a display position of the first screen and a display position of at least a part of display content on the second screen are switched in the display screen.

7 Claims, 10 Drawing Sheets

(51) Int. Cl.
*B60K 37/06* (2006.01)
*B60R 11/00* (2006.01)

(52) U.S. Cl.
CPC ....... *B60R 11/0264* (2013.01); *B60K 2370/11* (2019.05); *B60K 2370/111* (2019.05); *B60K 2370/113* (2019.05); *B60K 2370/1438* (2019.05); *B60K 2370/1442* (2019.05); *B60K 2370/1446* (2019.05); *B60K 2370/151* (2019.05); *B60K 2370/184* (2019.05); *B60K 2370/736* (2019.05); *B60K 2370/739* (2019.05); *B60K 2370/744* (2019.05); *B60K 2370/774* (2019.05); *B60R 2011/0005* (2013.01)

(58) Field of Classification Search
CPC ........ B60K 2370/113; B60K 2370/111; B60K 2370/774; B60K 2370/184; B60K 2370/11; B60K 2370/1446; B60K 2370/736; B60K 2370/739; B60K 2370/1442; B60R 11/0235; B60R 11/0264; B60R 2011/0005; G06F 3/0486; G06F 3/04842; G06F 3/04847; G06F 3/04886; G06F 3/0412–04886; B60W 50/08

See application file for complete search history.

(56) References Cited

U.S. PATENT DOCUMENTS

| | | | |
|---|---|---|---|
| 2013/0328766 A1* | 12/2013 | Igarashi | G06F 3/017 345/156 |
| 2014/0123064 A1 | 5/2014 | Matsumoto et al. | |
| 2015/0367729 A1* | 12/2015 | Oda | B60K 35/00 701/36 |
| 2016/0139798 A1* | 5/2016 | Takikawa | G06F 3/0482 345/173 |
| 2016/0202884 A1* | 7/2016 | Ohki | G06F 3/04842 715/784 |
| 2016/0288643 A1* | 10/2016 | Kotter | G06F 3/0488 |
| 2017/0010766 A1* | 1/2017 | Nakashima | G06F 3/0486 |
| 2017/0087989 A1* | 3/2017 | Kogler | B60K 37/06 |
| 2018/0208060 A1* | 7/2018 | Kim | B60W 50/14 |

FOREIGN PATENT DOCUMENTS

| | | |
|---|---|---|
| JP | 2003-280814 A | 10/2003 |
| JP | 2013-33451 A | 2/2013 |
| JP | 2013-137822 A | 7/2013 |
| WO | 2017/010601 A1 | 1/2017 |

* cited by examiner

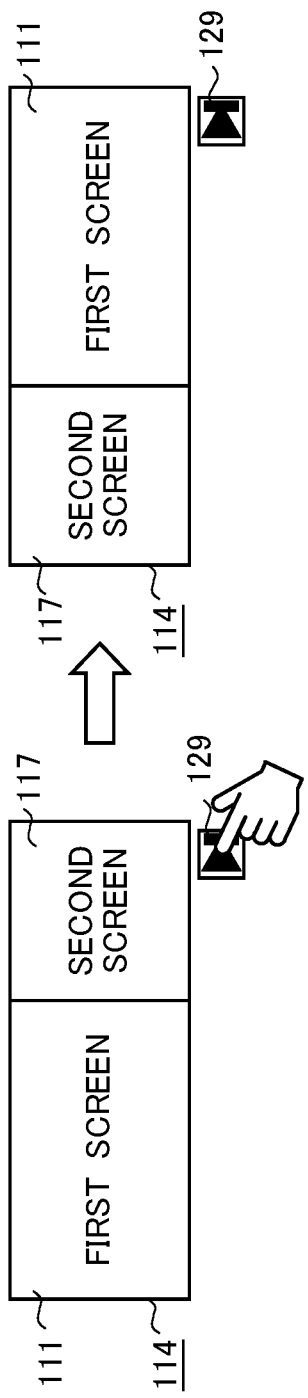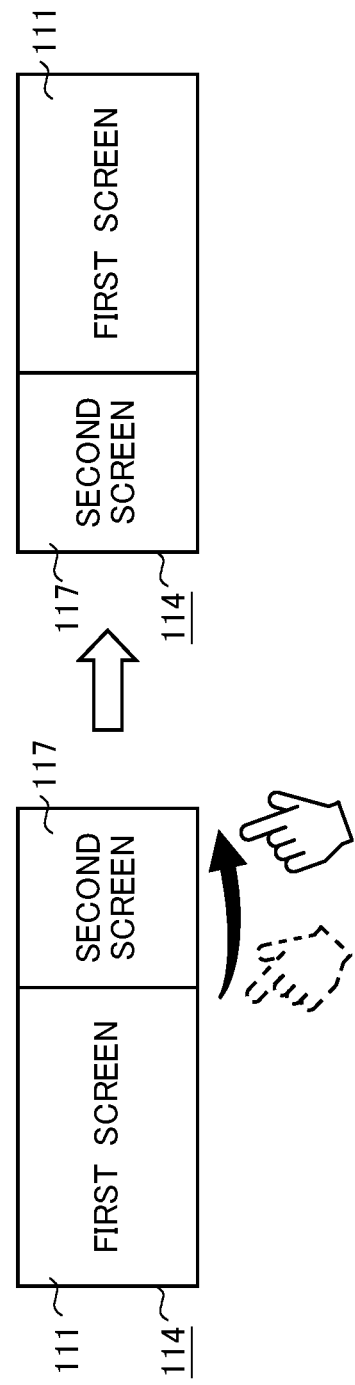

VEHICULAR DISPLAY DEVICE

BACKGROUND OF THE INVENTION

Field of the Invention

The present invention relates to a display device to be mounted to a vehicle or the like.

Description of the Background Art

A vehicle or the like includes, in front of a cockpit thereof, a display device that presents various information to users such as a driver and a passenger. The display device is typically a touchscreen obtained by superposing a touch panel on a display. The display device can be intuitively operated by touching a display screen thereof with a finger.

Increasing the size of the display screen has been considered in order to display much information in an easily viewable manner. However, in a vehicle, a user is seated on a seat, and thus, if the size is increased, there can be a range in which, even if the user stretches an arm, the hand does not reach the display screen. For example, it becomes difficult for a hand to reach a region that is apart from the seat by 720 mm or more. Thus, if, in particular, the length in the left-right direction of the display screen is increased, it becomes difficult to operate a portion close to the left or right end on a side that is farther from the seat.

Conventionally, the following features have been proposed: a feature in which a separate touch panel is provided in front of a display screen such that the display screen can be operated without being touched with a hand (Patent Document 1: Japanese Laid-Open Patent Publication No. 2003-280814, Patent Document 3: Japanese Laid-Open Patent Publication No. 2013-33451); and a feature in which a motion reception section for detecting a hand motion performed in front of a display screen is provided (Patent Document 2: Japanese Laid-Open Patent Publication No. 2013-137822).

In a case where an operation is performed on a region separate from the display screen as in each Patent Document, intuitive property for the operation is limited as compared with a case where the operation is performed on the display screen. In addition, in a case where a motion operation is performed in front of the display screen, accuracy of the operation is limited since it is difficult to identify a plurality of objects to be operated on the display screen.

SUMMARY OF THE INVENTION

The present invention is made in view of the aforementioned problems, and an object of the present invention is to provide a vehicular display device having excellent operability even if the size of a display screen thereof is increased in the left-right direction.

In order to solve the problems, one aspect of the present invention is a vehicular display device including: a touchscreen disposed substantially at a center position in a vehicle width direction in front of a cockpit of a vehicle; a reception section at least partially provided to the touchscreen and configured to receive operation input from a user; and a display control section configured to display, on a display screen of the touchscreen, a first screen corresponding to a first function and a second screen corresponding to a second function such that the first screen and the second screen are arrayed in a left-right direction, the display control section being configured to perform, in accordance with a predetermined first instruction operation received by the reception section, switching control in which a display position of the first screen and a display position of at least a part of display content on the second screen are switched in the display screen.

Accordingly, an operation can be performed on the display screen in a state where a screen to be operated is moved to a position that a hand of the user easily reaches, whereby the operability is excellent.

In addition, the display control section may display, on the display screen, the second screen as one or more regions provided to at least one of left and right sides of the first screen and having arc-shaped contours each protruding in a direction toward the first screen, and may sequentially display, in accordance with a predetermined second instruction operation received by the reception section, a plurality of pieces of the display content by moving the plurality of pieces of the display content along a circumferential direction of the arc-shaped contours in the second screen.

Accordingly, the plurality of pieces of the display content can be displayed with a simple operation.

In addition, the display control section may display the second screen as the regions such that the second screen is composed of a left portion provided on the left side of the first screen and a right portion provided on the right side of the first screen, and may perform, as the switching control, switching of the display position of the display content between the left portion and the right portion by parallelly moving rightward or leftward the first screen, and the left portion and the right portion of the second screen such that a display range of one of the left portion and the right portion becomes small and a display range of the other one of the left portion and the right portion becomes large.

In addition, the display control section may perform full-screen display of the second screen in accordance with a predetermined third instruction operation received by the reception section, and may display the first screen, and the right portion and the left portion of the second screen in accordance with a predetermined fourth instruction operation received by the reception section during the full-screen display of the second screen.

Owing to these features, a display screen having excellent operability can be provided.

In addition, the first screen may have a rectangular shape. The display control section may display, in a region between a left end edge that is a straight line of the first screen and a right end edge that is an arc of the left portion of the second screen in the display screen, an image generated on the basis of a pixel of at least the left end edge of the first screen, and may display, in a region between a right end edge that is a straight line of the first screen and a left end edge that is an arc of the right portion of the second screen in the display screen, an image generated on the basis of a pixel of at least the right end edge of the first screen.

Owing to this feature, the design of the display screen can be improved.

In the present invention, the arrangement of the screens can be at least partially switched. Thus, even if the size of the display screen is increased in the left-right direction, an object to be operated on each screen can be operated on the display screen from both users seated on the left and right seats, whereby a vehicular display device having excellent operability can be provided.

BRIEF DESCRIPTION OF THE DRAWINGS

FIG. 7 is a diagram showing an example of the display screen of the vehicular display device according to the embodiment of the present invention;

FIG. 8 is a diagram showing an example of the display screen of the vehicular display device according to the embodiment of the present invention;

DESCRIPTION OF THE PREFERRED EMBODIMENTS (Outline)

A vehicular display device according to the present invention at least partially switches, through a predetermined operation by a user, display positions of pieces of display content on a plurality of screens disposed at the left and the right. Accordingly, even if the size of a display screen is increased in the left-right direction, a user can easily operate a desired screen by moving the desired screen to a range in which a hand of the user reaches the desired screen.

Embodiment

An embodiment of the present invention will be described below in detail with reference to the drawings.

<Configuration>

Figure 1:
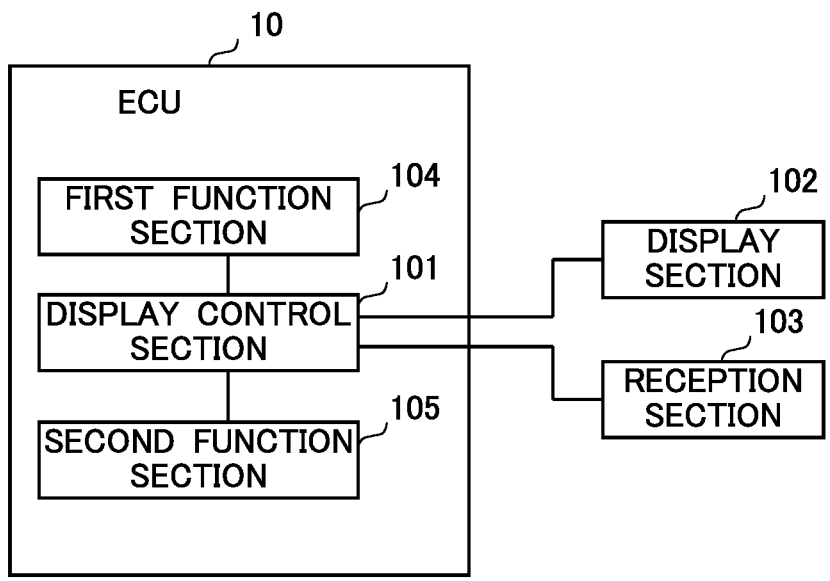
FIG. 1 is a functional block diagram of a vehicular display device according to an embodiment of the present invention.
Figure 2:
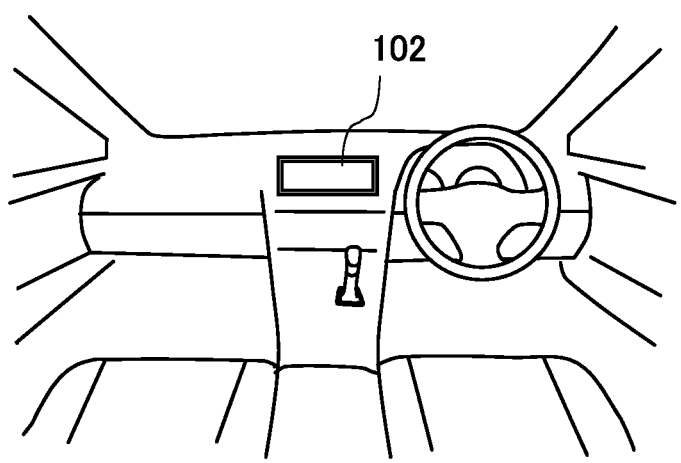
FIG. 2 illustrates an example of disposition of a display section of the vehicular display device according to the embodiment of the present invention.

FIG. 1 shows a functional block diagram of a vehicular display device 1 according to one aspect of the present embodiment. The vehicular display device 1 includes an electronic control unit ("ECU") 10, a display section 102, and a reception section 103. The ECU 10 includes, for example, a first function section 104 and a second function section 105 which control various functions of a vehicle, and a display control section 101 which combines display screens generated by the first function section 104 and the second function section 105, and outputs the resultant display screen to the display section 102. The display section 102 receives information about this display screen from the display control section 101, and displays the information on a display screen. FIG. 2 illustrates an example of disposition of the display section 102. As shown in FIG. 2, the display section 102 is disposed substantially at a center position in the vehicle width direction in front of a cockpit, and has, for example, an aspect ratio of 24:9, that is, has a relatively larger horizontal size.

The first function section 104 has a function as, for example, a car navigation system. The second function section 105 has a function of, for example, controlling devices such as an air conditioner and an audio instrument of the vehicle. The reception section 103 receives an operation from the user. Although the display section 102 and the reception section 103 are typically implemented by touchscreens each obtained by superposing a touch panel on a display, a part of the reception section 103 may be implemented by a physical button or the like instead of the touchscreen. The display control section 101 receives operation input received by the reception section 103. Then, in accordance with the type of the operation, the display control section 101 transfers the operation input to the first function section 104 or the second function section 105 so as to cause the first function section 104 or the second function section 105 to execute various functions, and changes, as described later, the screen to be displayed on the display section 102.

Figure 3:
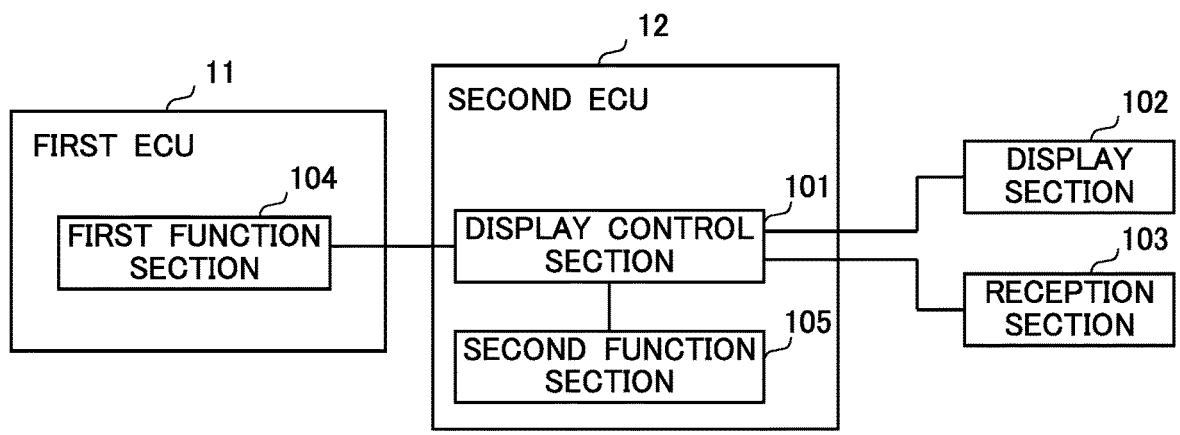
FIG. 3 is a functional block diagram of the vehicular display device according to the embodiment of the present invention.

FIG. 3 shows a functional block diagram of a vehicular display device 1 according to another aspect. In this aspect, the first function section 104 is provided to a first ECU 11, and the display control section 101 and the second function section 105 are provided to a second ECU 12. As described above, the vehicular display device 1 may be composed of a plurality of ECUs.

Figure 4:
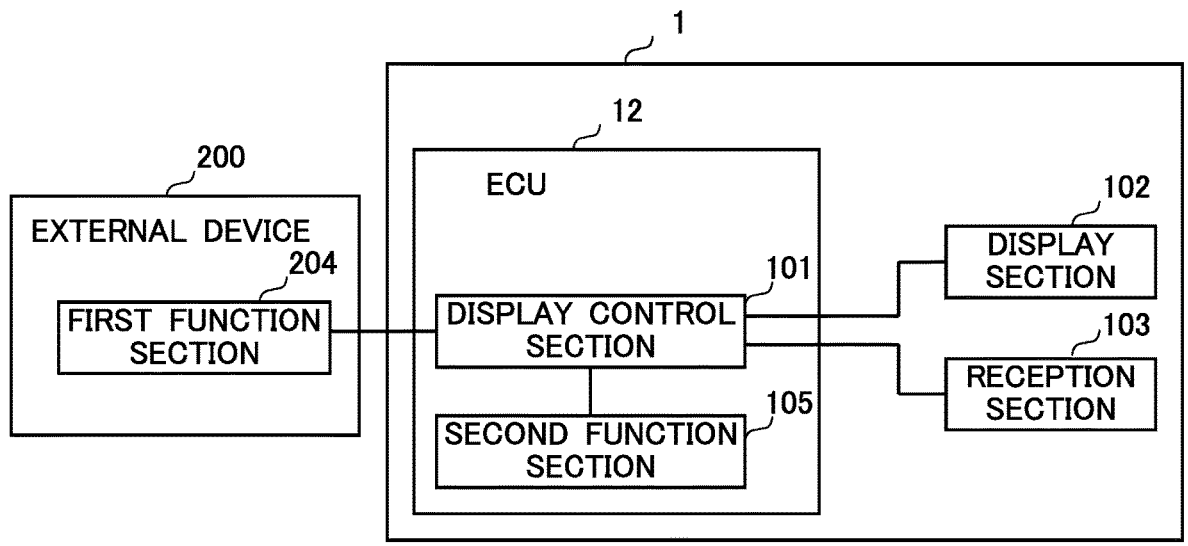
FIG. 4 is a functional block diagram of the vehicular display device according to the embodiment of the present invention.

FIG. 4 shows a functional block diagram of a vehicular display device 1 according to still another aspect. In this aspect, the first function section 104 is not provided to the vehicular display device 1, but a first function section 204 is provided to an external device 200. The vehicular display device 1 receives, from the external device 200, information for displaying a display screen. The external device 200 is not limited but may be another on-vehicle device, or a portable information device such as a smartphone. As described above, the vehicular display device 1 may receive the display screen from another device.

<Example of Display Control>

FIG. 5, FIG. 6, FIG. 7, and FIG. 8 show examples of display control of a display screen (touchscreen) 114 of the display section 102 performed by the display control section 101. The display screen is a horizontally long screen, and, on the display screen, a first screen 111 generated by the first function section 104 and corresponding to a first function, and a second screen 117 generated by the second function section 105 and corresponding to a second function, are displayed so as to be arrayed in the left-right direction. Although not shown, on each of the first screen and the second screen, an image for presenting various information to a user, and an operation part such as a button for receiving an instruction made through a touch operation or the like, are displayed as the display content. It is hard for a hand of a user seated on a right seat to reach the left end of the display screen, and it is hard for a hand of a user seated on a left seat to reach the right end of the display screen. Thus, the display control section 101 switches the positions of the first screen 111 and the second screen 117 in accordance with a predetermined switching-instruction operation received from each of the users by the reception section 103, so that an operation part on either one of the first screen 111 and the second screen 117 that a user intends to operate is moved to a range in which a hand of the user reaches the operation part. In FIG. 5, FIG. 6, FIG. 7, and FIG. 8, examples will be shown in which the user seated on the right seat performs switching between the first screen 111 and the second screen 117, thereby moving the first screen 111 close to himself/herself.

Figure 5:
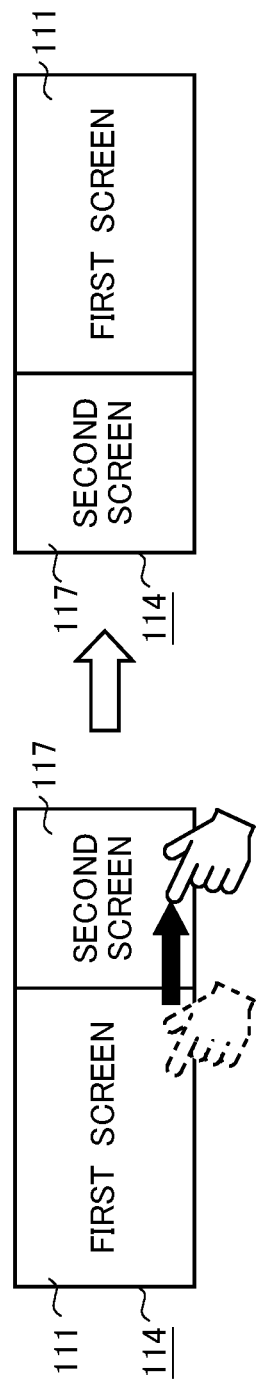
FIG. 5 is a diagram showing an example of a display screen of the vehicular display device according to the embodiment of the present invention.

In the example shown in FIG. 5, the display control section 101 performs, as the switching-instruction operation inputted to the reception section 103, switching between the first screen 111 and the second screen 117 when a rightward drag operation or flick operation is performed on the touchscreen 114.

Figure 6:
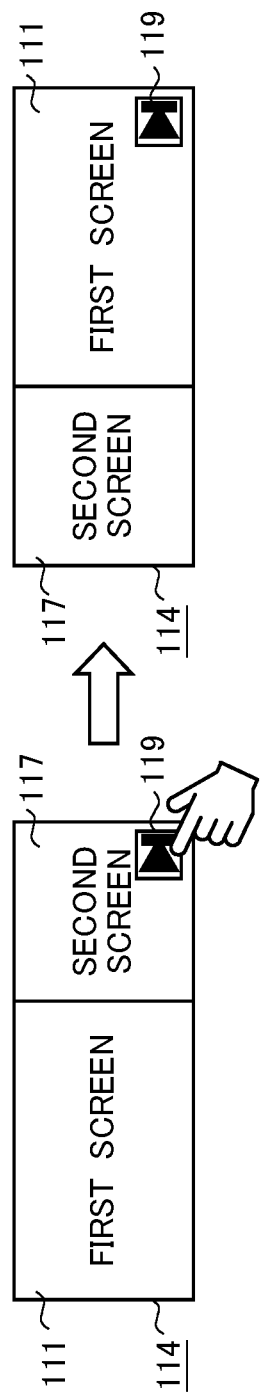
FIG. 6 is a diagram showing an example of the display screen of the vehicular display device according to the embodiment of the present invention.

In the example shown in FIG. 6, the display control section 101 performs, as the switching-instruction operation inputted to the reception section 103, switching between the first screen 111 and the second screen 117 when an operation is performed on a predetermined button image 119 displayed at a predetermined position on the touchscreen 114.

In the example shown in FIG. 7, the display control section 101 performs, as the switching-instruction operation inputted to the reception section 103, switching between the first screen 111 and the second screen 117 when an operation is performed on a predetermined physical button 129 disposed outside of the touchscreen 114.

In the example shown in FIG. 8, the display control section 101 performs, as the switching-instruction operation inputted to the reception section 103, switching between the first screen 111 and the second screen 117 when a motion sensor provided in the vehicle receives a predetermined motion operation.

With the above-described methods in the respective examples, the user seated on the right seat can move the first screen 111 close to himself/herself by performing switching between the first screen 111 and the second screen 117, and can operate, on the touchscreen, the operation part displayed in the first screen 111. Also in a case where the user is seated on the left seat and in a case where the second screen is moved close to the user, switching can be performed between the first screen 111 and the second screen 117 by employing the same methods, as necessary. As described above, the predetermined switching operation is received at a position that is close to a user and that is located on the display screen 114 or an area near the display screen 114, and, in accordance with the received switching operation, switching is performed between the first screen 111 and the second screen 117 arranged in the left-right direction, whereby the user can suitably operate each screen.

In addition, in the above-described examples, the second screen 117 may have an arc-shaped contour protruding toward the first screen 111, for example. In addition, the reception section 103 may receive a predetermined rotation-instruction operation for the second screen 117, and, in accordance with the rotation-instruction operation, the display control section 101 may display operation parts while moving the operation parts along the contour in the second screen 117. Accordingly, many operation parts can be sequentially displayed with a simple operation.

Example

Figure 9:
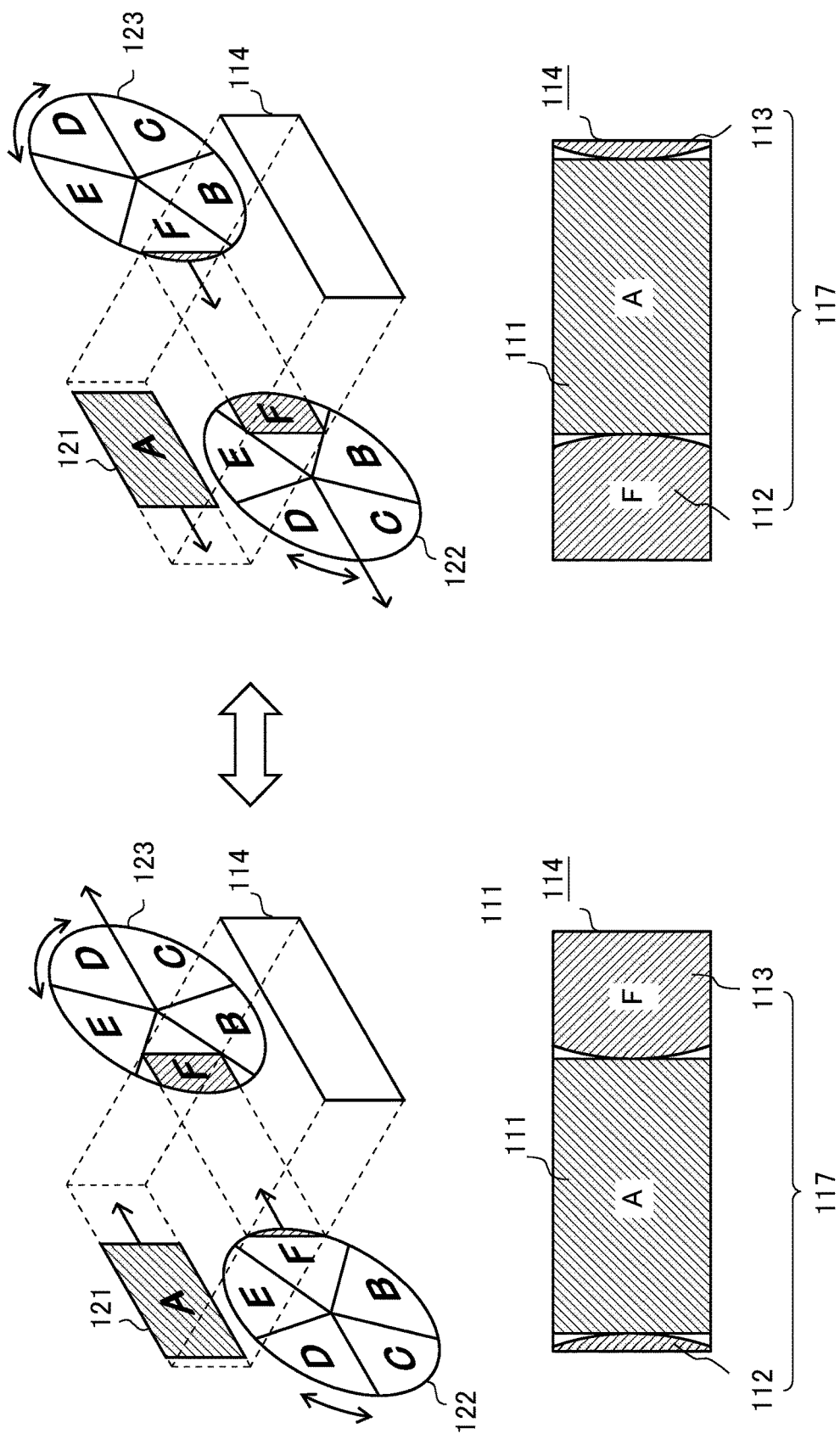
FIG. 9 is a diagram showing an example of a model of the display screen of the vehicular display device according to the embodiment of the present invention.

A specific configuration example regarding the arrangement of, and operation methods for, the first screen 111 and the second screen 117 will be described below. FIG. 9 shows a model that indicates an imaginary arrangement state for explaining behaviors of the first screen 111 and the second screen 117 in the display screen 114 of the display section 102.

In this model, a rectangular sheet 121 and two circular sheets 122 and 123 are disposed behind the display screen 114. The entirety of a region A of the rectangular sheet 121 is projected on the display screen 114, to form the first screen 111. A par of right half of the circular sheet 122, and a part of left half of the circular sheet 123, are projected on the display screen 114, to form a left portion 112 and a right portion 113 of the second screen 117. That is, in the display screen 114 based on this model, the second screen 117 includes two regions, i.e., the left portion 112 and the right portion 113, the left portion 112 of the second screen 117 is displayed on the left side of the rectangular first screen 111, and the right portion 113 of the second screen 117 is displayed on the right side of the first screen 111. In the second screen 117, the left portion 112 has an arc-shaped contour protruding toward the first screen 111, and the right portion 113 has an arc-shaped contour protruding toward the first screen 111.

In this model, the rectangular sheet 121 and the circular sheets 122 and 123 are parallelly movable in the left-right direction within a predetermined range. FIG. 9 shows a case where these sheets are located at the left end of the range of possible movement, and a case where these sheets are located at the right end of the range of possible movement. In addition, in this model, each of the circular sheets 122 and 123 is divided along the circumference thereof so as to have a plurality of regions B, C, D, E, and F, and pieces of display content (not shown) corresponding to a plurality of sub-functions included in the second function of the second function section 105 are allocated to the respective regions. The circular sheets 122 and 123 are, for example, rotated about the respective centers in opposite directions in a synchronized manner at the same speed, and orders of arrangement, around the centers, of the regions B, C, D, E, and F in the circular sheets 122 and 123 are opposite to each other. Accordingly, a region positioned at the right end of the circular sheet 122 and a region positioned at the left end of the circular sheet 123 are constantly the same as each other. The number of the regions is not limited to five as shown.

An example of screen transition of the display screen 114 according to the display control performed by the display control section 101 in accordance with a user operation received by the reception section 103, will be described below. In principle, in the screen transition, behaviors of the first screen 111, and the left portion 112 and the right portion 113 of the second screen are consistent with the above-described model. However, since the purpose of this is to make it easy to perform an intuitive operation on the basis of the model, these behaviors do not always have to be consistent with the model.

Figure 10:
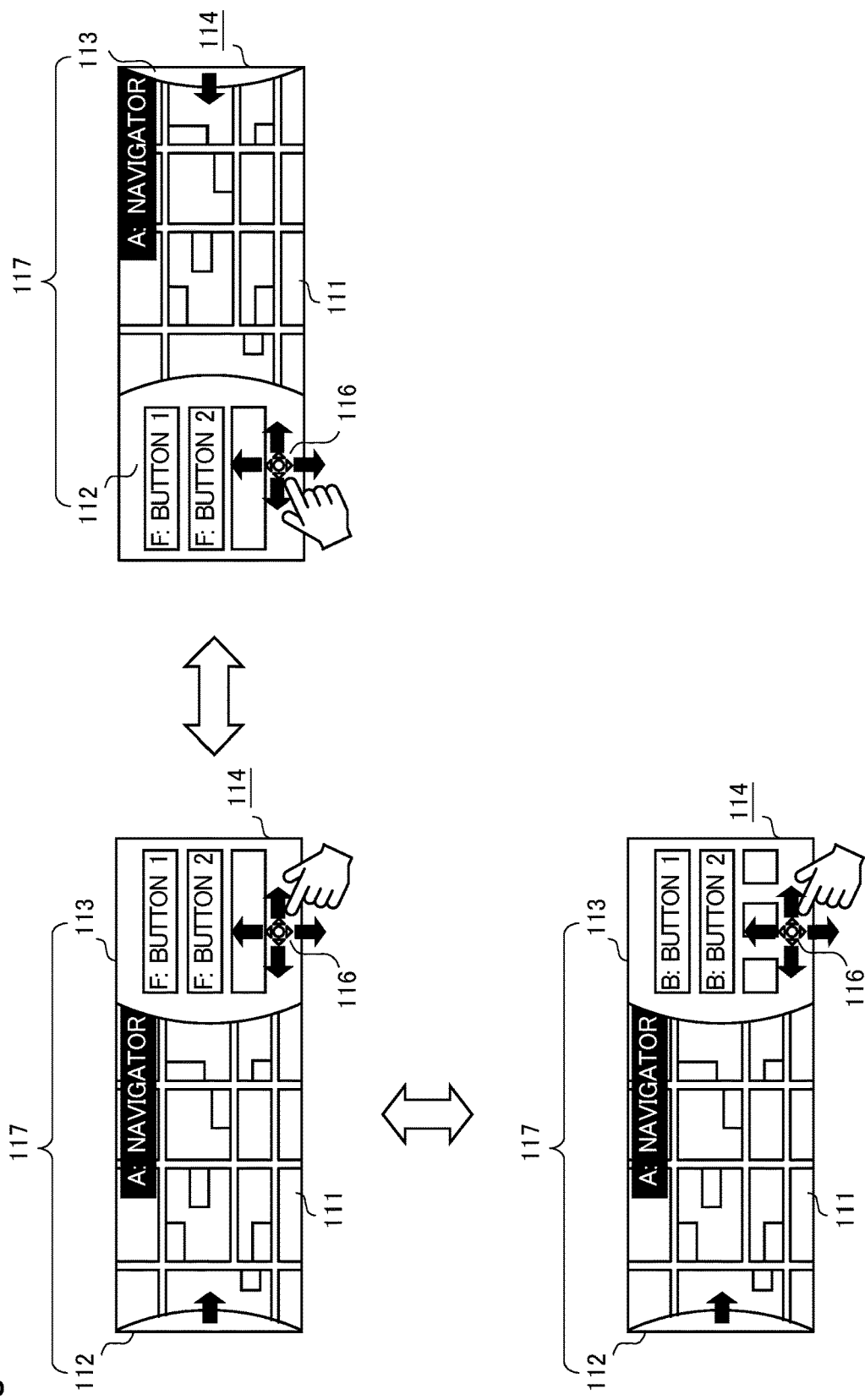
FIG. 10 is a diagram showing an example of the display screen of the vehicular display device according to the embodiment of the present invention.

FIG. 10 shows an example of the screen transition of the display screen 114. In a state shown on the upper left of FIG. 10, the right portion 113 of the second screen 117 is displayed so as to be large, and a plurality of operation buttons corresponding to the region F are displayed as the display content. Of the left portion 112 of the second screen 117, only a right end portion is displayed, and the display content such as an operation button is not displayed. In this state, when, for example, the user seated on the right seat performs, as the switching-instruction operation, a rightward drag operation or flick operation on the right portion 113 of the second screen 117, or when, for example, the user seated on the left seat performs, as the switching-instruction operation, a rightward drag operation or flick operation on the left portion 112 of the second screen 117, the first screen 111 and the left portion 112 and the right portion 113 of the second screen 117 parallelly move rightward, and transition to a state shown on the upper right of FIG. 10 occurs.

In the course of this transition, in the second screen 117, the display range of the right portion 113 becomes small, and the display range of the left portion 112 becomes large. Accordingly, the display position of the first screen 111 is switched from the left side of the display screen 114 to the right side of the display screen 114, and thus it becomes easy for the user seated on the right seat to make a hand reach the first screen 111 and easily operate the first screen 111. In addition, the display positions of the operation buttons on the second screen 117 are switched from the right portion 113 to the left portion 112, and thus it becomes easy for the user seated on the left seat to make a hand reach the plurality of operation buttons that are the display content on the second screen 117 and easily operate the second screen 117. When the operation buttons in the region F are displayed on the left portion 112 of the second screen 117, the operation buttons in the same region F are displayed also on the right portion 113 after the switching so as to be consistent with the above-described model. If the display content to be operated is not changed between before and after the switching in the second screen 117 as described above, excellent operability is obtained.

In the state shown on the upper left of FIG. 10, when, for example, the user seated on the right seat performs, as the rotation-instruction operation, an upward or downward drag operation or flick operation on the right portion 113 of the second screen 117, the display content on the right portion 113 of the second screen 117 moves along the circumferential direction of the arc-shaped contour of the right portion 113. In the course of this movement, the state of the right portion 113 is changed from a state where the display content in the region F is displayed to a state where display content in an adjacent region is displayed. In an example shown on the lower left of FIG. 10, as a result of an upward drag operation or flick operation being performed as the rotation-instruction operation, display content in the region B is displayed on the right portion 113. In addition, when, for example, an upward drag operation or flick operation is performed while the region F is displayed on the right portion 113, the circular sheet 123 is rotated clockwise in the above-described model so that the regions F, B, C, D, and E are displayed in this order on the display screen 114. On the other hand, when, for example, an upward drag operation or flick operation is performed while the region F is displayed on the left portion 112, the circular sheet 122 is rotated in an opposite direction, i.e., counterclockwise, in the above-described model so that the regions F, B, C, D, and E are displayed in the same order on the display screen 114. Thus, by performing the rotation-instruction operation in the same direction on the display screen 114, the plurality of regions are displayed in the same order on the left portion 112 and the right portion 113, whereby excellent operability is obtained.

In the state shown on the upper left of FIG. 10, it may be allowed that, for example, the user seated on the right seat performs, as the switching-instruction operation, a leftward drag operation or flick operation on the right portion 113 of the second screen 117. It is assumed that such an operation is intuitively performed as if the right portion 113 is sent leftward in a case where, for example, the user seated on the right seat wants to enable the user seated on the left seat to operate the operation buttons on the second screen. However, in the above-described model, this state corresponds to a state where the rectangular sheet 121 and the circular sheets 122 and 123 have reached the left end of the range of possible movement and thus cannot be moved further leftward. Therefore, when this operation is performed, the first screen 111, the left portion 112 and the right portion 113 of the second screen 117 are operated so as to be first parallelly moved leftward for a predetermined distance in accordance with the intention of the user, and then parallelly moved rightward in the same manner as that described above as if bouncing back. Acordingly, the screen transition can be performed in accordance with the intention of the user and the principle of the model.

Figure 11:
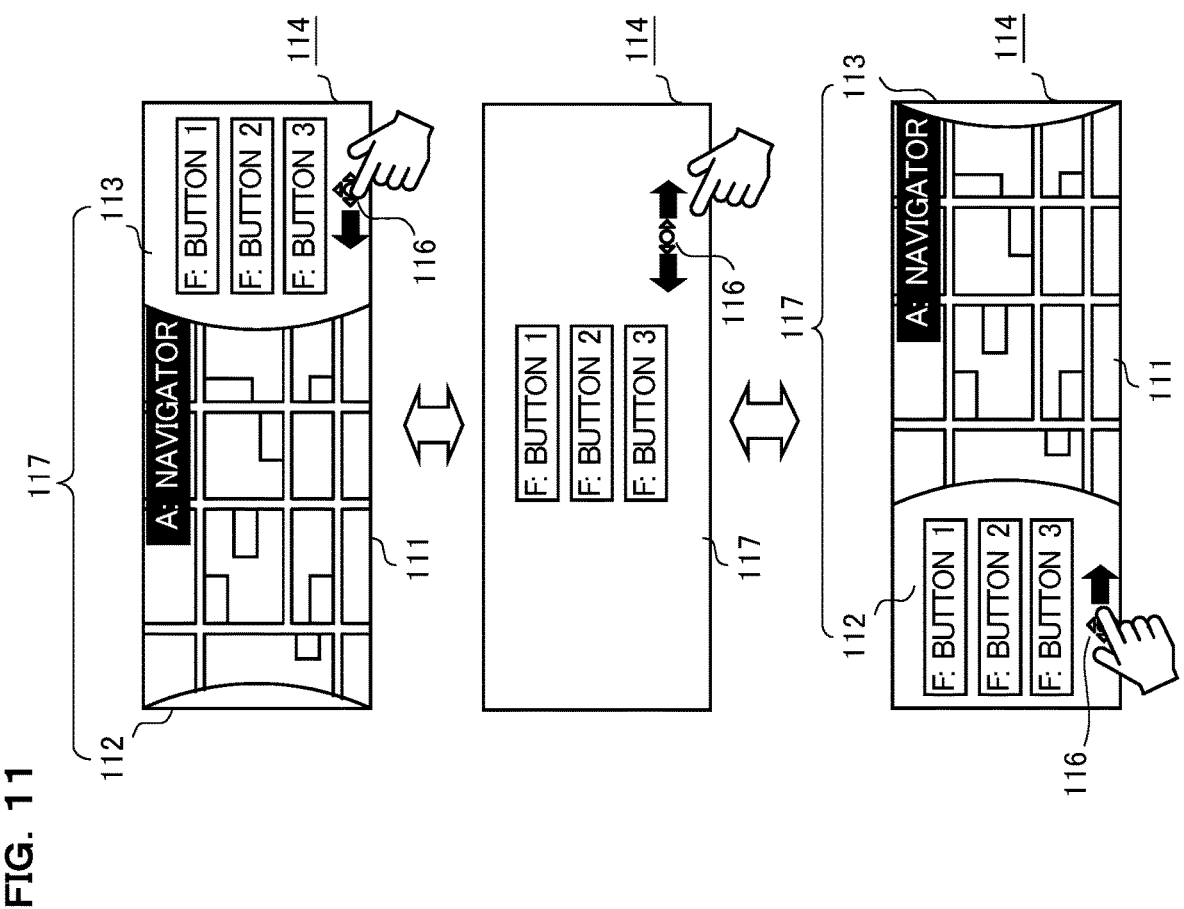
FIG. 11 is a diagram showing an example of the display screen of the vehicular display device according to the embodiment of the present invention.

Alternatively, in the state shown on the upper left of FIG. 10, when, for example, the user seated on the right seat performs a leftward drag operation or flick operation on the right portion 113 of the second screen 117, full-screen display may be performed instead of the switching. FIG. 11 shows an example of screen transition in a full-screen operation. A diagram shown on an upper part of FIG. 11 indicates the same state as that indicated on the upper left of FIG. 10. When a user performs a leftward drag operation or flick operation on the right portion 113 of the second screen 117, the display range of the right portion 113 gradually becomes large, and the full-screen display of the second screen 117 is performed as shown in a center part of FIG. 11. When a user performs a rightward drag operation or flick operation during the full-screen display, the first screen 111 is displayed from the left side of the second screen, and the display range of the second screen 117 gradually becomes small, so that the state of the second screen 117 can be returned to the state shown on the upper part of FIG. 11. The above-described operations can be modeled with the change in the display range of the right portion 113 being regarded as change in the diameter of the circular sheet 123 in the above-described model. Alternatively, when a user performs a leftward drag operation or flick operation during the full-screen display, the first screen 111 is displayed from the right side and the display range of the second screen gradually becomes small so that, as shown on a lower part of FIG. 11, a state is obtained where the left portion 112 having the operation buttons displayed thereon is displayed.

If the operation buttons on the second screen 117 are allowed to move from the right portion 113 to the left portion 112 with the full-screen display being performed in the course of the movement by performing the leftward operation twice as described above, although switching from the circular sheet 123 to the circular sheet 122 is performed in the above-described model, this movement is consistent with the intuition of the user, whereby excellent operability is obtained. In the case of the full-screen display, operation buttons and the like included in the display content on the second screen 117 are preferably disposed at a position close to the center of the display screen 114 such that the operation buttons and the like are easily operated from both users seated on the left and right seats. In a case where no display mode that supports full-screen display is prepared for the display content displayed on the second screen 117 before the full-screen display, such full-screen display does not have to be performed. In addition, during the full-screen display, the present display content may be moved upward or downward by an upward or downward drag operation or flick operation so as to make a change to display content in another region. However, in a case where a display mode that supports full-screen display is omitted to be prepared for display content in any of the regions B, C, D, E, and F, such changes to the display content in the other regions during the full-screen display may be uniformly omitted to be made.

Figure 12:
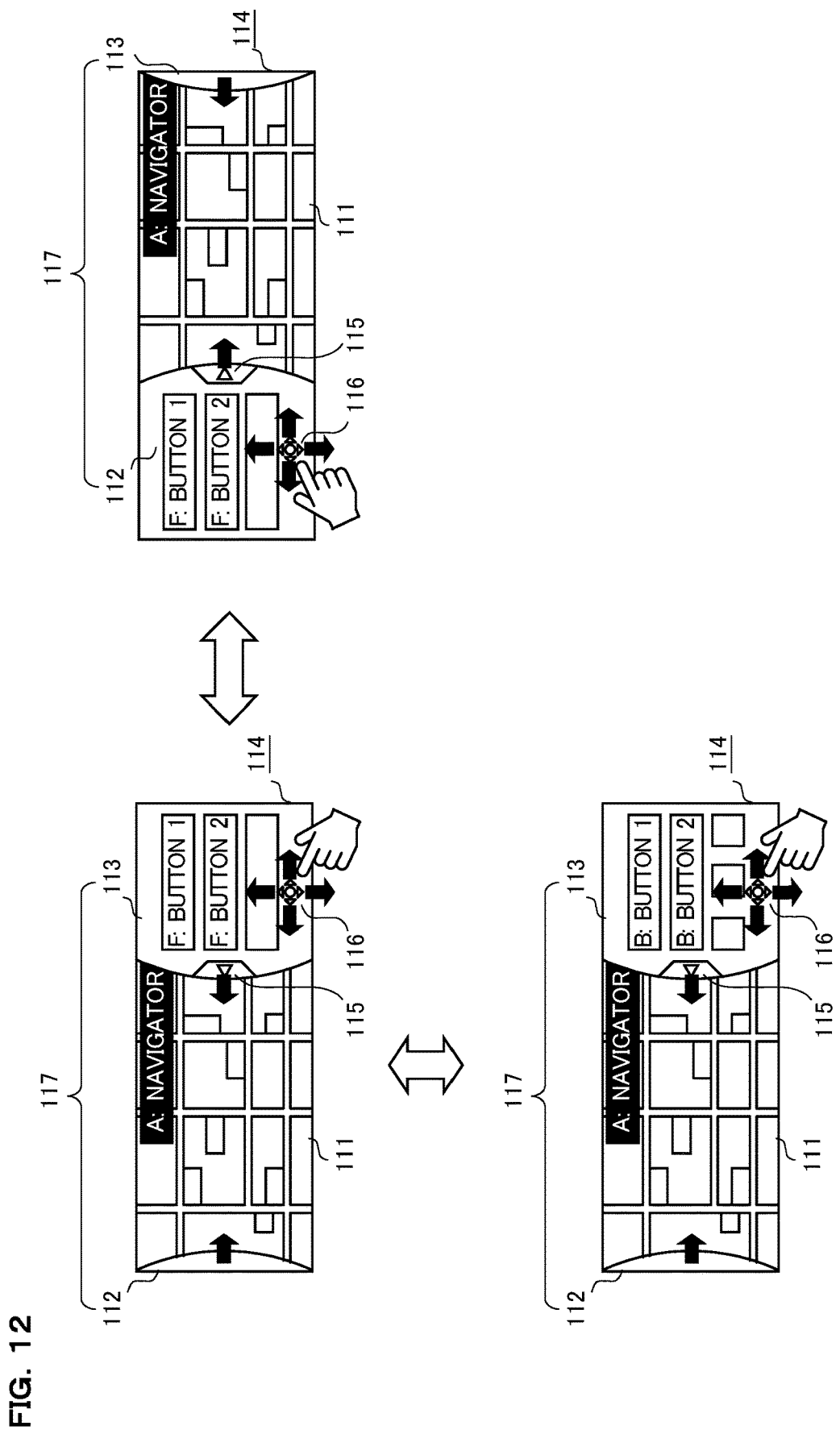
FIG. 12 is a diagram showing an example of the display screen of the vehicular display device according to the embodiment of the present invention.

FIG. 12 shows an example in which both the screen switching and the full-screen display can be performed when a user performs a leftward drag operation or flick operation on the right portion 113 of the second screen 117, in the state shown on the upper left of FIG. 10. A diagram on the upper left of FIG. 12 indicates the same state as that indicated on the upper left of FIG. 10, but is different therefrom in that a specific region 115 is provided at a predetermined portion of the right portion 113 on which the operation buttons of the second screen 117 are displayed. When, for example, the user seated on the right seat performs a leftward drag operation or flick operation on a region other than the specific region 115 of the right portion 113, transition to a state shown on the upper right of FIG. 12 occurs as in the example shown in FIG. 10. When, for example, the user seated on the right seat performs an upward or downward drag operation or flick operation on the right portion 113 of the second screen 117, the display content on the right portion 113 of the second screen 117 is moved along the circumferential direction of the arc-shaped contour of the right portion 113, and transition to a state shown on the lower left of FIG. 12 occurs as in the example shown in FIG. 10. When, for example, the user seated on the right seat performs a leftward drag operation or flick operation on the specific region 115 of the right portion 113, the full-screen display is performed as shown in the center part of FIG. 11. When a user performs a rightward or leftward drag operation or flick operation during the full-screen display, the state shown on the upper left or the upper right of FIG. 12 is obtained.

In the above description, each screen transition is started from the state where the right portion 113 of the second screen 117 is displayed so as to be large. However, since the operation specifications are symmetric between the left and the right, each of the screen transitions started from the state where the left portion 112 of the second screen is displayed so as to be large, can be performed by an operation that is opposite to the corresponding one of the above-described operations between the left and the right.

As described above, the following examples may be employed as specifications for operations to be received by the reception section 103.

(Operation Specification 1: Without Full-Screen Display)

The switching-instruction operation (first instruction operation) includes: a drag operation or flick operation performed, on a portion of which the display range is the smaller between the right portion 113 and the left portion 112 of the second screen 117, in a direction to the first screen 111 from the portion of which the display range is the smaller; and a drag operation or flick operation performed, on a portion of which the display range is the larger therebetween, in a direction from the first screen 111 to the portion of which the display range is the larger.

The rotation-instruction operation (second instruction operation) is an upward or downward drag operation or flick operation performed on a portion of which the display range is the larger between the right portion 113 and the left portion 112 of the second screen 117.

(Operation Specification 2: With Full-Screen Display and without Specific Region)

A full-screen display instruction operation (third instruction operation) is a drag operation or flick operation performed, on a portion of which the display range is the larger between the right portion 113 and the left portion 112 of the second screen 117, in a direction to the first screen 111 from the portion of which the display range is the larger.

A full-screen display cancellation instruction operation (fourth instruction operation) is a leftward or rightward drag operation or flick operation performed on the second screen 117 subjected to the full-screen display.

The switching-instruction operation (first instruction operation) includes: a drag operation or flick operation performed, on a portion of which the display range is the smaller between the right portion 113 and the left portion 112 of the second screen 117, in a direction to the first screen 111 from the portion of which the display range is the smaller; and a drag operation or flick operation performed, on a portion of which the display range is the larger therebetween, in a direction from the first screen to the portion of which the display range is the larger.

The rotation-instruction operation (second instruction operation) is an upward or downward drag operation or flick operation performed on a portion of which the display range is the larger between the right portion 113 and the left portion 112 of the second screen 117.

In addition, the switching-instruction operation (first instruction operation) may include, as an allowed operation, a drag operation or flick operation performed, on a portion of which the display range is the larger between the right portion 113 and the left portion 112 of the second screen 117, in a direction to the first screen 111 from the portion of which the display range is the larger.

(Operation Specification 3: With Full-Screen Display and with Specific Region)

The full-screen display instruction operation (third instruction operation) is a drag operation or flick operation performed, on the specific region provided on a portion of which the display range is the larger between the right portion 113 and the left portion 112 of the second screen 117, in a direction from the specific region to the first screen 111.

The full-screen display cancellation instruction operation (fourth instruction operation) is a leftward or rightward drag operation or flick operation performed on the second screen 117 subjected to the full-screen display.

The switching-instruction operation (first instruction operation) includes: a drag operation or flick operation performed, on a portion of which the display range is the smaller between the right portion 113 and the left portion 112 of the second screen 117, in a direction to the first screen from the portion of which the display range is the smaller; and a drag operation or flick operation performed, on a region other than the specific region of a portion of which the display range is the larger therebetween, in a direction from the first screen 111 to the portion of which the display range is the larger.

The rotation-instruction operation (second instruction operation) is an upward or downward drag operation or flick operation performed on a portion of which the display range is the larger between the right portion 113 and the left portion 112 of the second screen 117.

In addition, the switching-instruction operation (first instruction operation) may include, as an allowed operation, a drag operation or flick operation performed, on a region other than the specific region on a portion of which the display range is the larger between the right portion 113 and the left portion 112 of the second screen 117, in a direction to the first screen from the portion of which the display range is the larger.

In addition, in the above-described operation specifications and the like, the display control section 101 can perform the following display control.

(Display Control)

The display control section 101 performs parallel movement display of the first screen 111 and the second screen 117 in the same direction as an operation direction in the switching-instruction operation so as to switch the display position of the display content on the second screen 117 between the left portion 112 and the right portion 113 of the second screen 117 so that a display region having been displayed on one of the left portion 112 and the right portion 113 of the second screen 117 before the switching, is displayed on the other one after the switching.

The display control section 101 performs rotational movement display along an operation direction in the rotation-instruction operation such that the display content on the second screen 117 moves along the arc-shaped contour, with the display order of the display content on the second screen 117 relative to the operation direction in the rotation-instruction operation being the same between the left portion 112 and the right portion 113.

In a case where the above-described allowed operation is performed as the switching instruction, the display control section 101 performs the parallel movement display of the first screen 111 and the second screen 117 for a predetermined distance in the same direction as an operation direction in the allowed operation, and then performs the parallel movement display in a direction opposite to the operation direction, thereby performing switching display.

In addition, when performing the full-screen display, the display control section 101 performs the full-screen display of the second screen 117 in accordance with the full-screen display instruction operation.

Then, when receiving the full-screen display cancellation instruction operation during the full-screen display of the second screen 117, the display control section 101 displays the first screen 111, and the left portion 112 and the right portion 113 of the second screen 117. In the full-screen display cancellation instruction operation, if the operation direction is the left direction, the display content is displayed on the left portion 112 of the second screen 117, whereas, if the operation direction is the right direction, the display content is displayed on the right portion 113 of the second screen 117.

In the examples shown in FIG. 10, FIG. 11, and FIG. 12, an operation guide 116 indicating the directions in which operations can be performed, is displayed in each state. The operation guide 116 may be constantly displayed by the display control section 101. Alternatively, the operation guide 116 may be prevented from being felt annoying by a user familiar with the operations by inhibiting unnecessary display as a result of the operation guide 116 being displayed in a case where no operation by a user is detected for a predetermined time period and thus it is assumed that the user is unfamiliar with the operations. Alternatively, the operation guide 116 does not have to be displayed.

In addition, when performing leftward or rightward parallel movement display of the first screen 111, and the left portion 112 and the right portion 113 of the second screen 117, the display control section 101 may delay the timing of starting the parallel movement display of the first screen 111, relative to the timing of starting the parallel movement display of the right portion 113 and the left portion 112 of the second screen 117. Alternatively, the speed of the parallel movement display of the first screen 111 may be lower than the speed of the parallel movement display of the right portion 113 and the left portion 112 of the second screen 117. Alternatively, these features may be combined with each other. Accordingly, a state where the first screen 111 follows the movements of the left portion 112 and the right portion 113 of the second screen 117 can be expressed, and intuitive dynamic design reflecting the above-described model can be provided, whereby excellent operability is obtained.

The above-described operation methods are examples, and the operations methods with buttons, motions, or the like as shown in FIG. 5, FIG. 6, FIG. 7, and FIG. 8 may be employed. Alternatively, a plurality of these operation methods may be used in combination. In any case, the position at which the operation for the screen switching is received is preferably a position that a hand of a user easily reaches.

Figure 13:
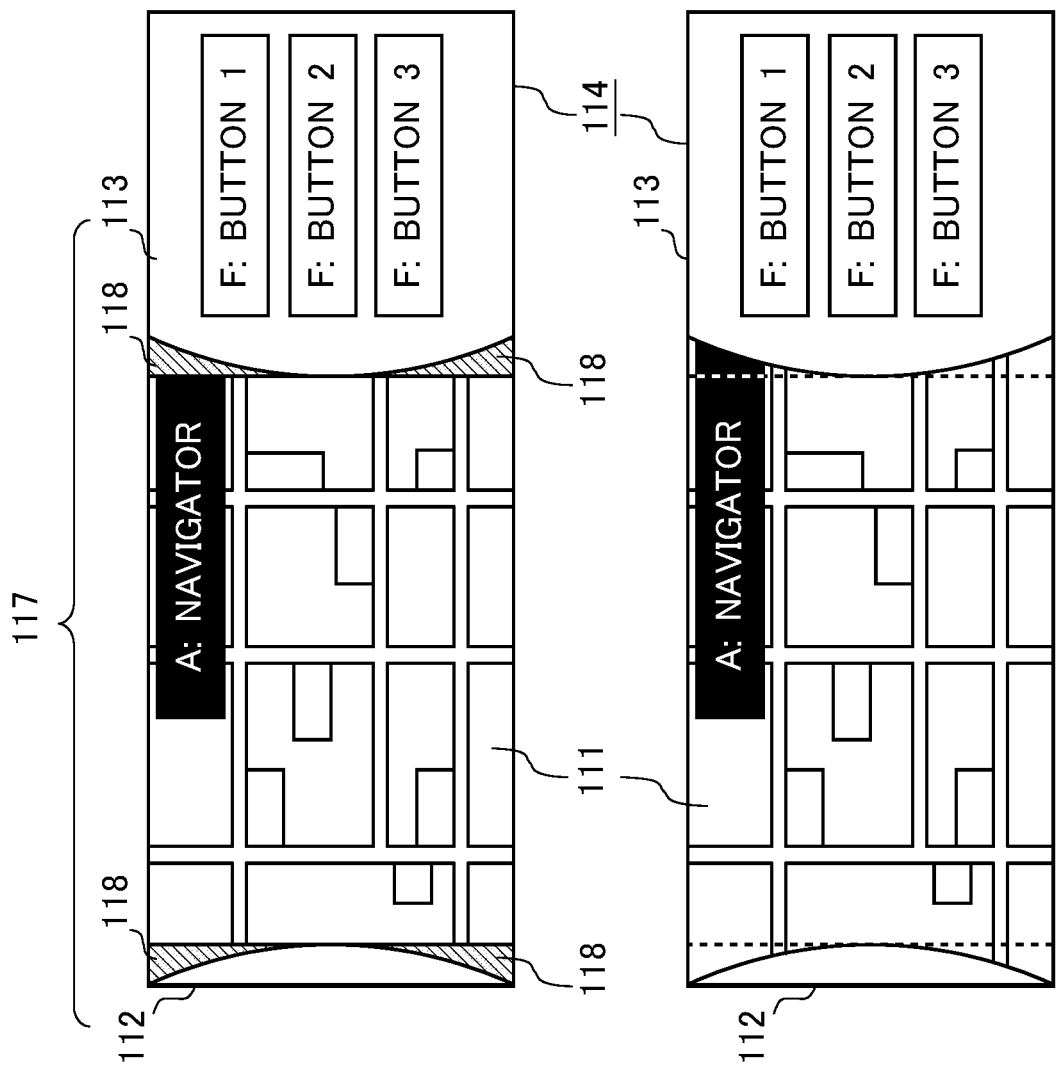
FIG. 13 is a diagram showing an example of the display screen of the vehicular display device according to the embodiment of the present invention.

Gaps are formed between the left end of the rectangular first screen 111 and the arc-shaped right end of the left portion 112 of the second screen 117, and between the right end of the first screen 111 and the arc-shaped left end of the right portion 113 of the second screen 117. An example of the gaps 118 which can be formed in the display screen 114 is shown on an upper part of FIG. 13. In the gaps 118, for example, complementary images generated on the basis of a part of an image of the first screen 111 are displayed. The complementary images can be generated by, for example, the display control section 101 copying the colors of pixels at a left end portion of the first screen 111 to the gaps 118 on the left side relative to the left end portion, and copying the colors of pixels at a right end portion of the first screen 111 to the gaps 118 on the right side relative to the right end portion. An example of the display screen 114 on which the complementary images generated in this manner are displayed, is shown on a lower part of FIG. 13. FIG. 10, FIG. 11, and FIG. 12 also show examples in which the complementary images are displayed as described above. Besides the above, each complementary image may have, for example, gradations applied thereto such that the brightness decreases from the first screen toward the left-right direction. By complementing the gaps 118 as described above, the boundaries between the first screen 111 and the second screen 117 are prevented from becoming unnatural, and design can be provided as if the first screen 111 is located behind the second screen 117 so as to be consistent with the above-described model.

Figure 14:
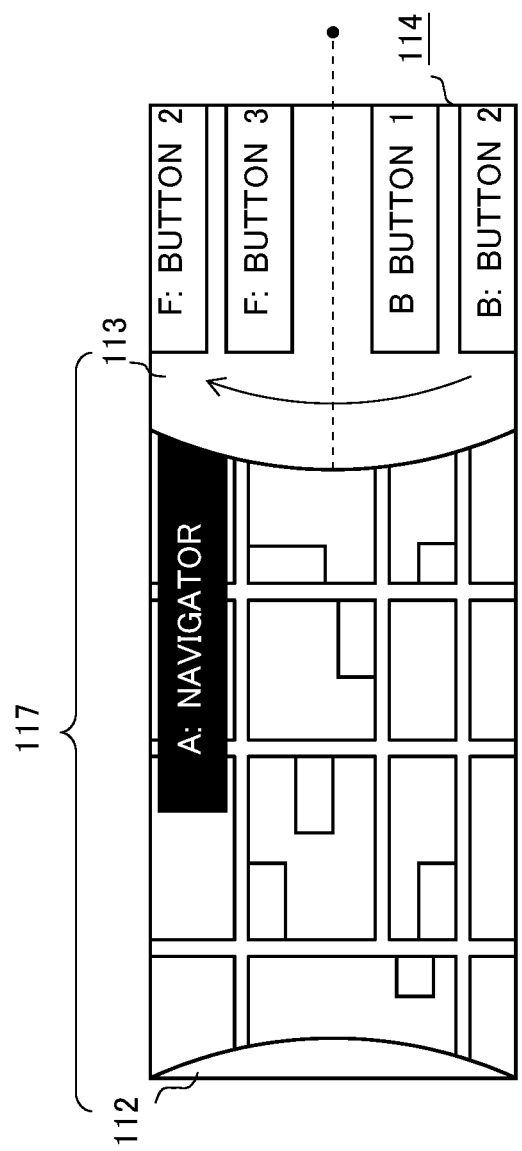
FIG. 14 is a diagram showing an example of the display screen of the vehicular display device according to the embodiment of the present invention.

FIG. 14 shows an example of a state where the display content on the right portion 113 of the second screen moves along the circumferential direction of the arc-shaped contour of the right portion 113. If, as shown in FIG. 14, the display control section 101 displays, when moving the display content in each region, the right portion 113 such that a representative position at a center portion of each region is rotationally moved with the center of the arc-shaped contour being an axis and such that the orientation of each of display content such as operation buttons included in each region is kept unchanged, the operation buttons are visually recognized easily even during the movement, whereby excellent operability is obtained.

In addition, the display control section 101 may not only display the first screen 111 and the second screen 117 but also perform the full-screen display, on the display screen 114, of a screen related to another function when, for example, receiving and displaying a monitor image showing an area behind the vehicle in a case where the shift lever is in a reverse range.

If a configuration as shown in FIG. 3 and FIG. 4 in which the first screen 111 is received from a device different from the ECU including the display control section 101 is employed, a screen that, for example, has a conventional aspect ratio and is generated by a conventional device can be used as the first screen 111, whereby the range of application of the present invention can be easily expanded.

(Effect)

According to the present invention, the arrangement of the screens displayed so as to be arrayed in the left-right direction of the display screen can be at least partially switched. Thus, even if the size of display screen is increased in the left-right direction, the object to be operated on each screen can be operated on the display screen from both users seated on the left and right seats, whereby a vehicular display device having excellent operability can be provided.

If the arrangement of the screens can be changed as described above, the present invention may be implemented with arbitrary combination of the above-described features, and the features may be modified or omitted, as appropriate. For example, a part of the display content may be displayed also on a portion of which the display range is the smaller between the left portion and the right portion of the second screen. In addition, the left portion and the right portion of the second screen may each include, in addition to the portion that is moved in response to the rotation-instruction operation, a portion that is constantly displayed without being moved. In addition, the present invention can be taken not only as a vehicular display device, but also as a screen control method and a program to be executed by a computer including a touchscreen, a computer-readable non-transitory storage medium having the program stored therein, and the like.

The present invention is useful for a display device in a vehicle or the like.

What is claimed is:

1. A vehicular display device comprising:
   a touchscreen disposed substantially at a center position in a vehicle width direction in front of a cockpit of the vehicle;
   a reception section at least partially provided to the touchscreen;
   an electronic control unit configured to:
      display, on a display screen of the touchscreen, a first screen corresponding to a first function and a second screen corresponding to a second function such that the first screen and the second screen are arrayed in a left-right direction,
      perform, in accordance with a predetermined first instruction operation received from a user via the reception section, switching control in which a display position of the first screen and a display position of at least a part of display content on the second screen are switched in the display screen,
      display, on the display screen, the second screen as one or more regions provided to at least one of left and right sides of the first screen and having arc-shaped contours each protruding at ends of the second screen that are adjacent to the first screen in a direction toward the first screen,
      sequentially display, in accordance with a predetermined second instruction operation received from the user via the reception section, a plurality of pieces of the display content by moving the plurality of pieces of the display content along a circumferential direction of the arc-shaped contours in the second screen,
      display the second screen as the one or more regions such that the second screen is composed of a left portion provided on the left side of the first screen and a right portion provided on the right side of the first screen, and
      perform, as the switching control, switching of the display position of the display content between the left portion and the right portion by parallelly moving rightward or leftward the first screen, and the left portion and the right portion of the second screen such that a display range of one of the left portion and the right portion becomes small and a display range of the other one of the left portion and the right portion becomes large.

2. The vehicular display device according to claim 1, wherein
   the electronic control unit is configured to:
      perform full-screen display of the second screen in accordance with a predetermined third instruction operation received from the user via the reception section, and
      display the first screen, and the right portion and the left portion of the second screen in accordance with a predetermined fourth instruction operation received from the user via the reception section during the full-screen display of the second screen.

3. The vehicular display device according to claim 2, wherein
   the first screen has a rectangular shape, and
   the electronic control unit is configured to:
      display, in a region between a left end edge that is a straight line of the first screen and a right end edge that is an arc of the left portion of the second screen in the display screen, an image generated based on a pixel of at least the left end edge of the first screen, and
      display, in a region between a right end edge that is a straight line of the first screen and a left end edge that is an arc of the right portion of the second screen in the display screen, an image generated based on a pixel of at least the right end edge of the first screen.

4. The vehicular display device according to claim 1, wherein
   the first screen has a rectangular shape, and
   the electronic control unit is configured to
      display, in a region between a left end edge that is a straight line of the first screen and a right end edge that is an arc of the left portion of the second screen in the display screen, an image generated based on a pixel of at least the left end edge of the first screen, and
      display, in a region between a right end edge that is a straight line of the first screen and a left end edge that is an arc of the right portion of the second screen in the display screen, an image generated based on a pixel of at least the right end edge of the first screen.

5. The vehicular display device according to claim 1, wherein the electronic control unit is configured to display an arc-shaped contour, of the second screen, which protrudes in the direction toward the first screen also after the switching control.

6. The vehicular display device according to claim 1, wherein the electronic control unit is configured to display, in the second screen, an operation guide for indicating an operation direction for at least the predetermined first instruction operation.

7. The vehicular display device according to claim 6, wherein the electronic control unit is configured to display the operation guide when the predetermined first instruction operation is not detected in a predetermined time.

\* \* \* \* \*